Jan. 21, 1969  R. F. DEHN  3,422,963
SAFETY SUSPENSION FOR CAB OF STACKER CRANE
Filed May 22, 1967  Sheet 1 of 3
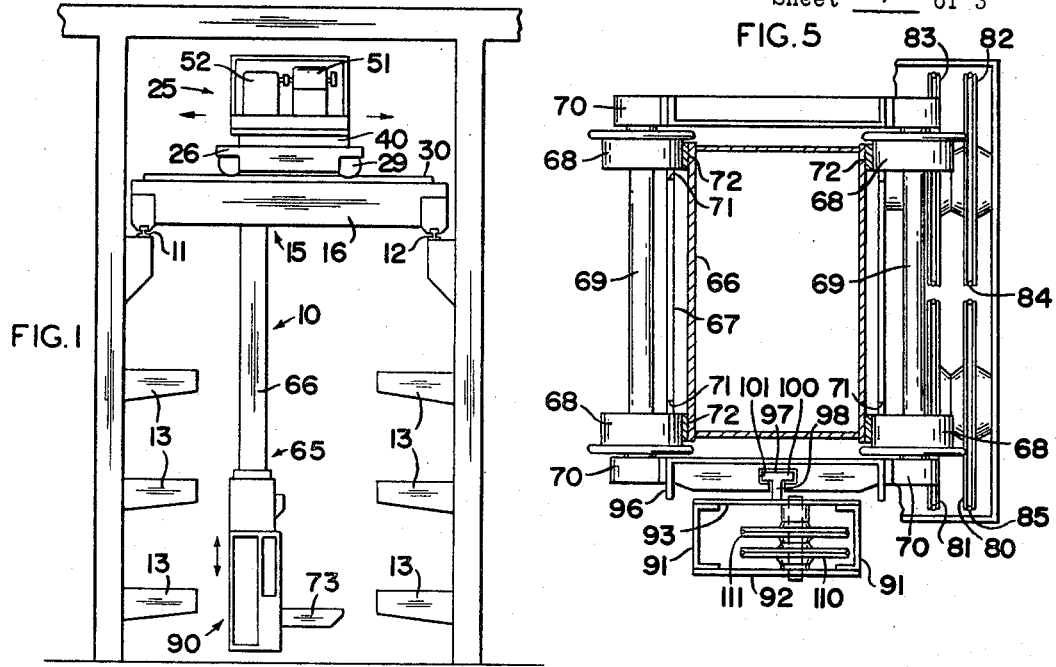
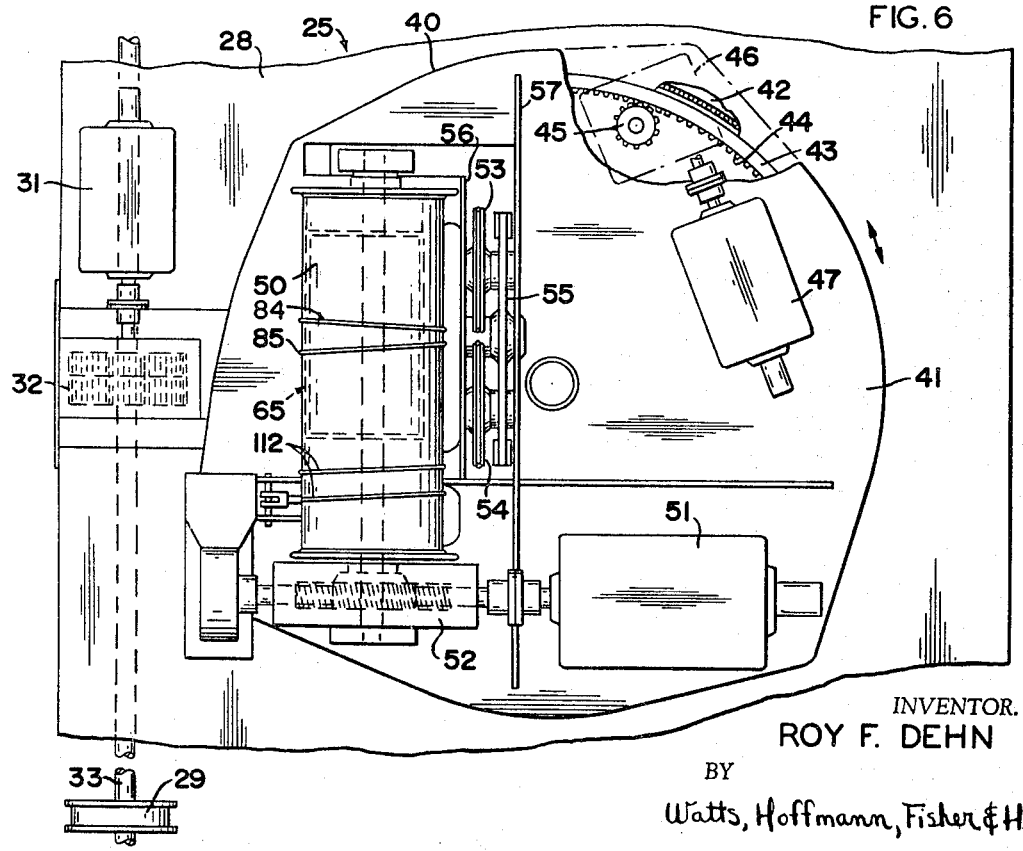
INVENTOR.
ROY F. DEHN
BY
Watts, Hoffmann, Fisher & Heinke
ATTORNEYS.

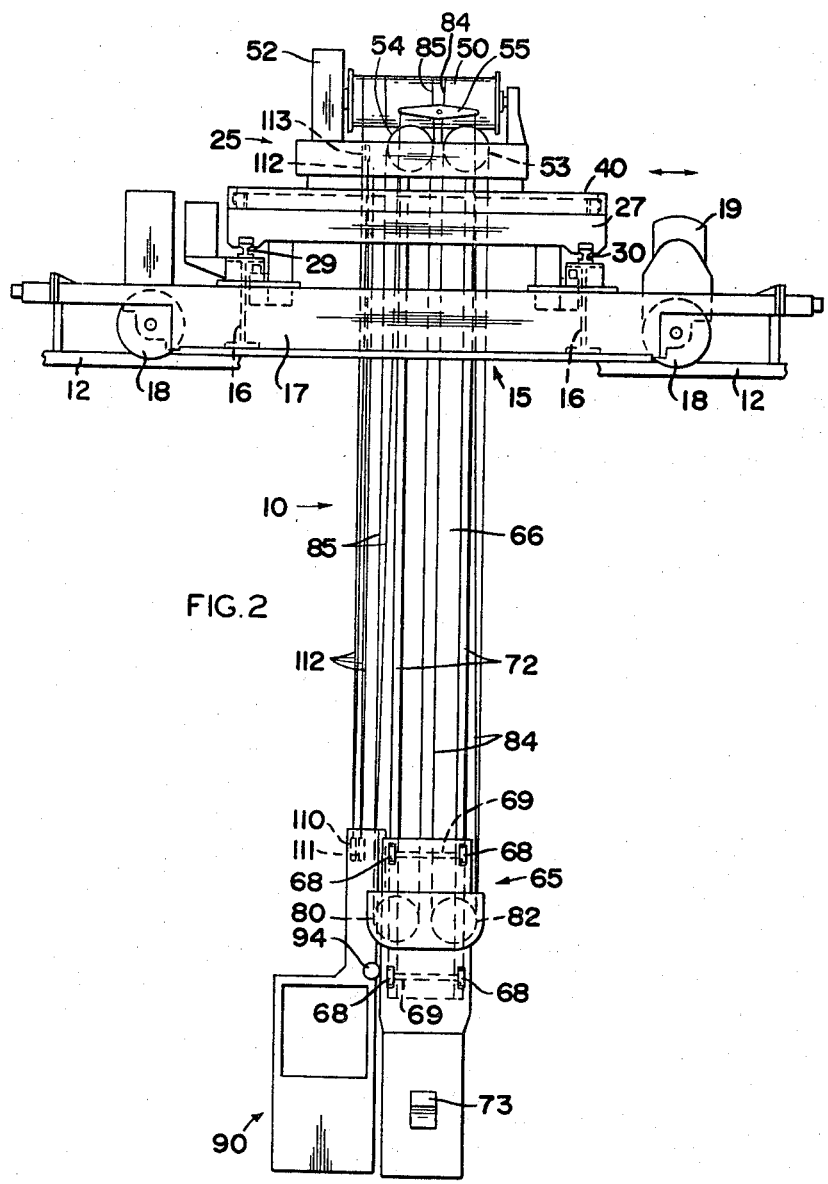

Jan. 21, 1969 R. F. DEHN 3,422,963
SAFETY SUSPENSION FOR CAB OF STACKER CRANE
Filed May 22, 1967 Sheet 3 of 3

INVENTOR.
ROY F. DEHN
BY
Watts, Hoffmann, Fisher & Heinke
ATTORNEYS.

3,422,963
SAFETY SUSPENSION FOR CAB OF STACKER CRANE
Roy F. Dehn, Wickliffe, Ohio, assignor to McNeil Corporation, a corporation of Ohio
Filed May 22, 1967, Ser. No. 640,318
U.S. Cl. 212—128                                    5 Claims
Int. Cl. B66c 19/00, 17/00

ABSTRACT OF THE DISCLOSURE

A stacker crane including a load carriage and an operator's cab supported by separate hoist systems for vertical travel along a single mast, and safety structure for supporting the cab in the event of failure of its hoist system.

Background of the invention

This invention relates generally to overhead supported material-handling apparatus and, more particularly, to traveling cranes of the so-called stacker type having one or more masts and a vertically movable load-carriage and operator's cab.

Cranes of the type described normally include structure designed to assure the safety of the operator by preventing the operator's cab from falling in the event that the hoist system fails or is rendered inoperative. In some instances the operator's cab is directly supported by the load carriage and a safety device is provided for clamping the load carriage to the mast of the crane in the event that the cables or other means for hoisting the carriage break. In another known stacker crane construction, the cab is secured to an elevatable section of a mast structure that is raised or lowered by a hoist system connected to the carriage. If the hoist system fails when the cab and mast section are at an elevated position, safety structure operates to clamp the load-carriage together with the movable mast section to a fixed portion of the mast depending from the overhead support. Any arrangement such as those described wherein the safety of the operator depends upon preventing the load carriage from falling may not be suitable for large cranes designed for supporting heavy loads because it becomes impractical to prevent the load carriage from falling.

One prior art safety arrangement proposed for large stacker cranes comprises a separate mast and a separate hoist system for the operator's cab. Thus, the cab is supported and guided for vertical movement by structure completely independent of the structure for guiding and supporting the load carriage. A safety device is provided for clamping the operator's cab to the mast on which it is supported in the event that the cable supporting the cab breaks. This prior art arrangement including separate masts for the operator's cab and for the load carriage is complex and imposes considerable additional weight on the overhead support.

Summary of the invention

The present invention provides a new and improved safety suspension arrangement for an operator's cab of an overhead traveling crane. The new safety suspension arrangement is particularly useful for large size stacker cranes capable of supporting heavy loads which make it impractical to prevent the load carriage of the crane from falling. An important feature and advantage of the invention is that the operator's cab is guided and supported for vertical travel along the same mast as the load carriage and yet is normally independent of the load carriage. As distinguished from the prior art construction described above embodying two separate masts, the single mast arrangement of the present invention reduces the weight on the overhead support.

An object of the invention is the provision of a new and improved overhead supported material-handling apparatus, particularly a traveling crane having a downwardly extending mast, an elevatable load carriage guided and supported on the mast for vertical movement, an operator's cab guided for vertical movement along the mast, and structure which prevents the cab from falling in the event its hoist system fails or becomes inoperative.

Another object of the invention is the provision of a new and improved overhead supported material-handling apparatus, particularly a traveling crane having a downwardly extending vertical mast, an elevatable load carriage guided and supported on the mast for vertical movement, an elevatable operator's cab guided for vertical movement along the mast, separate hoist systems for the cab and for the carriage, and structure which prevents the cab from falling in the event of failure of its hoist system.

Another object of the present invention is the provision of a new and improved overhead support material-handling apparatus, particularly a traveling crane having a downwardly extending mast, an elevatable load carriage guided and supported on the mast for vertical movement, an elevatable operator's cab guide for vertical movement along the mast, separate hoist systems for the load carriage and for the cab, whereby the cab will be supported by its independent hoist system in the event that the hoist system for the carriage breaks or becomes inoperative, and structure for supporting the cab from the load carriage in the event that the hoist system for the cab breaks or becomes inoperative.

The invention resides in certain constructions, combinations and arrangement of parts, and further objects and advantages will be apparent to those skilled in the art to which it relates from the following description of the preferred embodiment made with reference to the accompanying drawings forming a part of this specification.

Description of the drawings

FIGURE 1 is a schematic, elevational view showing a stacker crane embodying the present invention mounted for travel on a runway;

FIGURE 2 is an enlarged, elevational view of the stacker crane shown in FIG. 1;

FIGURE 5 is an enlarged cross-sectional view taken along the line 5—5 of FIG. 4, with portions of the stacker crane broken away or removed for clarity; and, FIGURE 6 is an enlarged, fragmentary plan view of the stacker crane shown in FIG. 2 with portions of the apparatus broken away.

Description of the preferred embodiment

Figure 4:
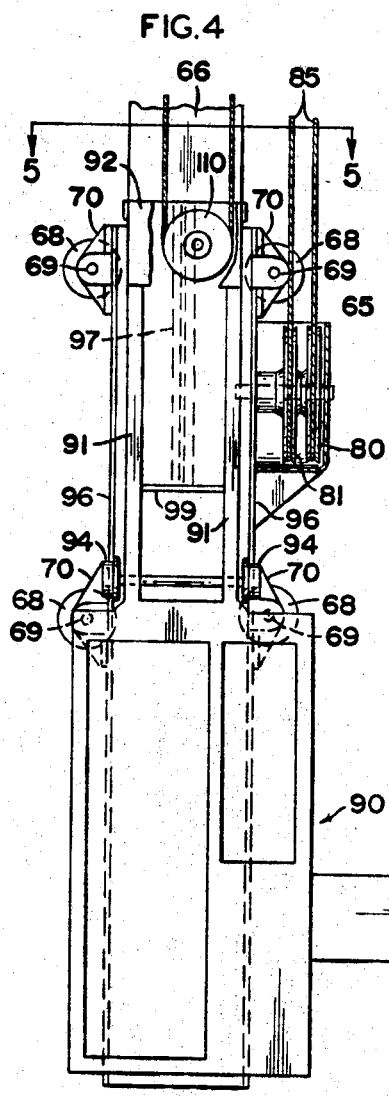
FIGURE 4 is a view taken along the line 4—4 of FIG. 3.

Referring now to the drawings, and to FIGS. 1 and 2 in particular, the present invention is shown as embodied in a traveling crane 10 supported overhead by spaced rails 11, 12 and movable therealong. The spaced rails 11, 12 form a runway for the traveling crane 10 and may be positioned between rows of bins or shelves 13 for storing articles to be handled by the crane.

The traveling crane 10 includes a bridge or support 15 comprised of girders 16 that extend between the spaced rails 11, 12 and are connected by transverse members or beams 17. The bridge or support 15 is mounted for movement along the rails 11, 12 by wheels 18. The bridge 15 is provided with a reversible electric bridge motor 19 for driving one set of the wheels 18 to move the bridge along the rails 11, 12 in a conventional manner.

A carrier or trolley 25 is mounted on the bridge 15 for movement in a direction transverse to the rails 11, 12. The trolley 25 is shown as comprising a main frame portion formed by side members or beams 26 that are connected by cross members 27. A plate 28 (FIG. 6) is welded to the upper surfaces of the members 26, 27 and is reinforced on its underside by other plates (not shown) to form a rigid frame structure. The main frame of the trolley 25 has wheels 29 that run on rails 30 mounted along the tops of the bridge beams 16. A reversible electric motor 31 is mounted on the plate 28 and is suitably connected to a set of the wheels 29, such as by a gear drive arrangement 32 and a drive shaft 33, to move the trolley 25 along the rails 30.

The trolley 25 also includes a platform 40 that is rotatable about a vertical axis. As is best shown in FIG. 6, the rotating platform 40 is comprised of a plate 41 mounted above a large opening through the plate 28 of the main trolley frame. The plate 41 is rotatably supported by a ball thrust bearing assembly 42 having an outer race secured to the underside of the plate 41 and an inner race mounted around a fixed ring 43 that is secured to the plate 28. The fixed ring 43 has gear teeth 44 around its inner periphery that are engaged by a gear 45 of a gear rotation drive 46 including a motor 47 carried by the plate 41. Actuation of the gear rotation drive 46 services to rotate the platform 40 through engagement of the gear 45 with the teeth 44 of the fixed ring 43.

The rotating platform 40 carries a cable drum 50 mounted on the plate 41. The cable drum 50 is driven by a motor 51 through a worm gear hoist drive 52. A pair of rotatable cable sheaves 53, 54 and a pivoted equalizer bar 55 are mounted by a suitable framework including structural members 56, 57 secured to the top of the plate 41.

An elevatable load carriage 65 is guided and supported in its vertical movement on a mast 66 which is carried by and depends from the rotatable platform 40 of the trolley 45. The illustrated mast 66 is a welded construction which is rectangular in cross-section and has its upper end secured to the underside of the plate 41. The load carriage 65 is comprised of an elongated rectangular frame structure 67 through which the mast 66 extends in telescoping relationship. Upper and lower sets of rollers 68 carried on shafts 69 are connected to opposite sides of the frame structure 67 by journal mountings 70. The rollers 68 extend through openings 71 in the sides of the frame structure 67 and engage vertical rails 72 secured to opposite sides of the mast 66 to guide and stabilize the load carriage 65 in its vertical travel. The load carriage 65 is also shown as including a tine 73 which extends from the frame structure 67 near its lower end.

In the illustrated construction of the crane 10, a cable lift system is provided for moving the load carriage 65 on the mast 66. The cable lift system includes the sheaves, 53, 54 on the trolley 25, a pair of axially aligned sheaves 80, 81 rotatably connected to the load carriage 65 below the sheave 54, and a second set of axially aligned sheaves 82, 83 rotatably connected to the load carriage 65 below the sheave 53. A cable 84 has one end secured to the cable drum 50 and is trained aronud the sheaves 83, 53, and 82. The cable 84 is dead-ended to the equalizer bar 55. A second cable 85 has one end fixed to the drum 50 and is trained around the sheaves 81, 54, 80 and is dead-ended to the other end of the equalizer bar 55.

Figure 3:
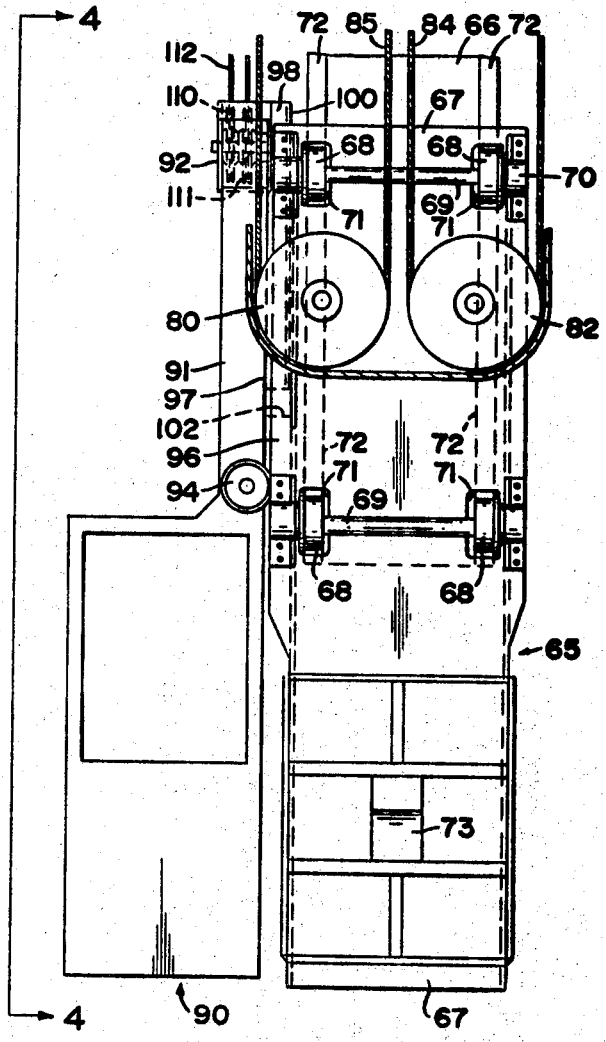
FIGURE 3 is an enlarged, fragmentary view of a portion of the crane shown in FIG. 2.

According to the present invention, an operator's cab 90 is moved with the load carriage 65 and is guided indirectly for vertical movement along the mast 66 through the load carriage 65. As shown in FIGS. 3, 4 and 5, the operator's cab 90 is adjacent one side of the load carriage 65 and includes a pair of spaced, upstanding channel members 91 which are connected at their upper ends by a pair of plates 92, 93. The cab 90 is stabilized against the side of the load carriage 65 by structure including a pair of flanged rollers 94 mounted on the ends of a shaft 95 which extends between the channel member 91 near their lower ends. The rollers 94 abut the edges of vertical flanges 96 which are formed as part of the load carriage frame 67. In the illustrated construction, the flanges of the rollers 94 engage the inner side edge surfaces of the load carriage frame flanges 96 to prevent swaying of the cab 90 relative to the load carriage.

The operator's cab 90 also includes a vertical structural member 97 which is preferably in the form of a T-beam extending parallel to the channel members 91. The central web 98 of the beam 97 is secured at the upper end of the beam to the plate 93 of the operator's cab 90 and the lower end of the beam is secured to the channel members 91 by a cross piece 99. The flanges 100 of the beam 97 which project outwardly of the central web 98 are normally engaged in a vertically extending, T-shaped channel 101 (FIG. 5) formed in a side member which is part of the frame 67 of the load carriage 65. The lower end of the channel 101 is closed and in the normal position of the operator's cab 90, the lower end of the beam 97 is spaced above the bottom wall 102 of the channel 101, as shown in FIG. 3. The engagement of the T-beam 97 in the channel 101 stabilizes the upper end of the operator's cab against sideways movement and movement away from the mast 66. In addition the T-beam 97 cooperates in the channel 101 to provide a safety arrangement that prevents the cab from falling in the event of failure of the cab-lifting system, as will be more fully described.

The cab-lifting or hoist system is shown as comprising a pair of sheaves 110, 111 which are rotatably mounted on the operator's cab 90 between the plates 92, 93. A cable 112 has one end fixed to the drum 50 and is trained around the sheaves 110, 111 and a sheave 113 (FIG. 2) rotatably mounted in a suitable manner on the rotatable platform 40 of the trolley 25. The other end of the cable 112 is dead-ended on the trolley 25 as shown in FIG. 6.

With the described arrangement a separate cable lift system is provided for the operator's cab 90 so that it is normally raised and lowered along the mast 66 independently of but with the load carriage 65. In the event that the load carriage cables 84, 85 should break, the load carriage 65 may fall, but the operator's cab 90 will remain suspended by the cable 112. If the hoist cable 112 for the operator's cab 90 should break, the cab will drop a short distance until the T-beam 97 engages the bottom wall 102 of the channel 101. Thus engaged, the cab 90 will be supported by the load carriage 65 and will be prevented from falling.

From the foregoing description of the preferred embodiment of the invention, it will be apparent that the objects and advantages of the invention enumerated above have been accomplished. There as been provided a new traveling crane construction which includes a load carriage and an operator's cab supported by separate cable systems for preventing the cab from falling in the event of failure of its hoist. The preferred safety structure for the operator's cab comprising the T-beam 97 engaged in the channel 101 of the load carriage is relatively simple and eliminates the need for the complex, prior art safety devices that were designed to clamp the operator's cab to the mast in the event of cable failure. Another advantage of the invention is that safety devices are not required for the load carriage to assure the safety of the operator. Thus, the invention is particularly useful for so-called "stacker" cranes designed for heavy loads where it is impractical to provide safety devices that will prevent the load carriage from falling.

While a preferred stacker crane construction embodying the present invention has been described, it will be understood that the invention can be embodied in other arrangements and structure for supporting the mast for movement overhead and for rotation. The mast itself may be comprised of one or more elevatable, telescoping sections, as is conventional in the art.

What is claimed is:

1. A material-handling apparatus comprising a movable over-head support, vertical mast structure carried by said support, a load carriage guided and supported on the said mast structure for vertical travel, an operator's cab mounted for vertical travel along said mast structure, first hoisting means connected to said cab, second hoisting means connected to said carriage, means for simultaneously actuating said first and second hoisting means to raise and lower said cab and said carriage at the same rate of speed, and means for supporting said cab on said carriage in the event of failure of said first hoisting means for said cab.

2. In a material-handling apparatus including a movable overhead support, a vertical mast, and means connecting said mast to said support, a load carriage guided and supported on said mast for vertical travel, an operator's cab engaging said load carriage and guided by said carriage for vertical travel therewith along said mast, first hoisting means connected to said carriage, second hoisting means connected to said cab for supporting it independent of said carriage, means for simultaneously actuating said hoisting means at the same rate of speed whereby said carriage and said cab are moved as a unit along said mast, and said cab including structure normally spaced above a portion of said carriage during vertical travel of said load carriage and said cab, said structure being engageable with said carriage portion in the event of failure of said second hoisting means whereby said cab will be supported by said carriage.

3. In an apparatus as claimed in claim 2 wherein said carriage includes a channel and wherein said structure of said cab comprises a member disposed in said channel above said portion of said carriage.

4. In an apparatus as claimed in claim 3 wherein said member is in the form of a T-beam mounted vertically on said cab.

5. In a material-handling apparatus including a movable overhead support, a vertical mast, and means connecting said mast to said support, a first elevatable structure comprising a load carriage guided and supported on said mast for vertical travel, a second elevatable structure comprising an operator's cab engaging said first structure and guided by said first structure for vertical travel therewith along said mast, first hoisting means connected to said first structure, second hoisting means connected to said second structure, means for simultaneously actuating said hoisting means at the same rate of speed whereby said structures are moved as a unit along said mast, one of said structures including a vertical channel, the other of said structures including a vertical beam slidably engaged in said channel to stabilize said cab against sidewise movement and movement away from said mast, and means in said channel normally spaced from said beam during movement of said structures along said mast, said beam being engageable with said means in said channel in the event of failure of said second hoisting means to prevent said second structure from falling.

References Cited

UNITED STATES PATENTS

| 3,202,242 | 8/1965 | Dolphin | 187—9 |
| 3,247,930 | 4/1966 | Lagerman | 187—73 |
| 3,250,399 | 5/1966 | Dechantsreiter | 212—21 |
| 3,263,777 | 8/1966 | Robichon | 187—9 |

EVON C. BLUNK, *Primary Examiner.*

H. C. HORNSBY, *Assistant Examiner.*

U.S. Cl. X.R.

212—21